Figure 1:
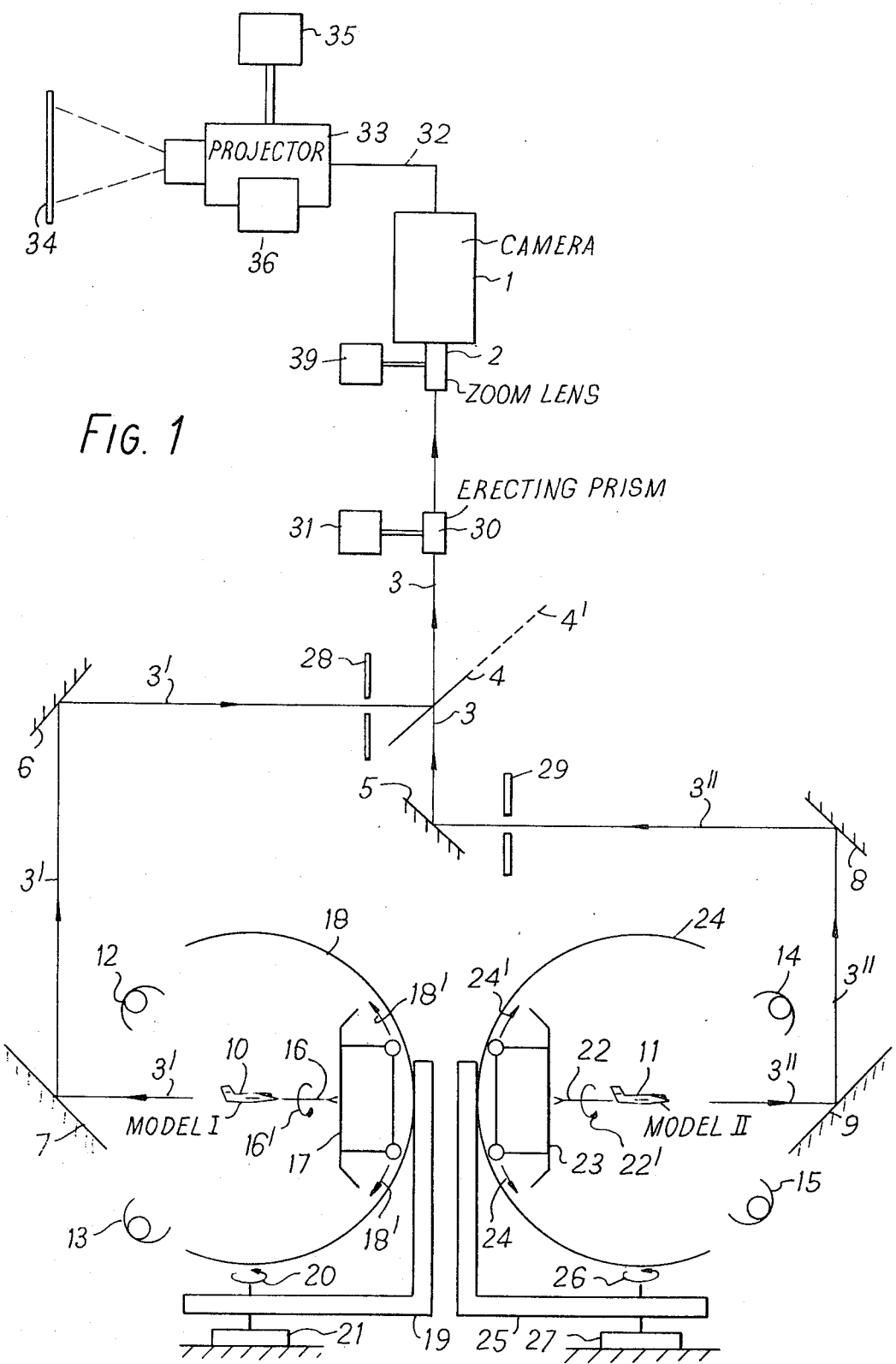

United States Patent [19]
Pedlar et al.

[11] 3,924,342
[45] Dec. 9, 1975

[54] GROUND-BASED FLIGHT SIMULATORS

[75] Inventors: Roy Pedlar, Lindfield; Brian Malcolm Boustred, Hookwood, nr. Horley, both of England

[73] Assignee: Redifon Limited, London, England

[22] Filed: Apr. 19, 1974

[21] Appl. No.: 462,524

[30] Foreign Application Priority Data
May 23, 1973  United Kingdom............... 24713/73

[52] U.S. Cl........... 35/12 N; 178/7.88; 178/DIG. 35
[51] Int. Cl.².......................................... G09B 9/08
[58] Field of Search........... 35/11, 12 L, 12 N, 10.2, 35/25; 178/6.8, DIG. 35, DIG. 38, 7.88; 235/1.50, 184

[56] References Cited
UNITED STATES PATENTS

| | | | |
|---|---|---|---|
| 3,281,519 | 10/1966 | Giordano | 35/10.2 |
| 3,422,207 | 1/1969 | Flower et al. | 35/12 N X |
| 3,507,989 | 4/1970 | Wolff | 35/25 X |
| 3,560,644 | 2/1971 | Petrocelli et al. | 35/11 X |
| 3,603,726 | 9/1971 | Garber et al. | 35/12 N X |
| 3,746,782 | 7/1973 | Driskell | 178/DIG. 35 |
| 3,804,977 | 4/1974 | Driskell | 35/11 X |
| 3,833,758 | 9/1974 | Ferrari | 178/6.8 |

Primary Examiner—Richard C. Pinkham
Assistant Examiner—Vance Y. Hum
Attorney, Agent, or Firm—Larson, Taylor & Hinds

[57] ABSTRACT

A double scale model and television viewing camera arrangement for providing a visual display of a second aircraft, as viewed from a simulated trainee aircraft in ground-based flight simulator apparatus. Two models are used, a first mounted at its front, for generally rear views, and a second mounted at its rear, for generally front views. Both models are mounted on four-gimbal systems for movement to provide the required attitude relative to the viewer and either one is viewed, by way of split or alternative optical paths, according to whether a view in the front hemisphere or in the rear hemisphere of the second aircraft is required.

12 Claims, 1 Drawing Figure

GROUND-BASED FLIGHT SIMULATORS

This invention relates to ground-based flight simulators.

The object of the invention is to provide, in a ground-based flight simulator, apparatus for producing an image of a second craft, for observation by the trainee crew using the said flight simulator.

Accordingly, the invention provides, for use in a ground-based flight simulator for simulating flight of a first craft, apparatus for producing an image of a second craft comprising first and second models of said second craft, the first for providing a generally rear view and the second for providing a generally front view of said second craft, both models being correspondingly movable according to the desired aspect angle of the second craft from the first craft, camera means and means for enabling the said camera selectively to view either the first or the second of the two said models.

Conveniently, the camera means comprises a single television camera arranged so that it can view both models.

It will be appreciated that if the models are mounted on a support, for example a rotatable shaft, that support will be visible to the camera for some aspect angles of the craft. Hence, two models are used and are supported at opposite ends. The selective viewing of the two models is then determined according to whether a generally rear view or a generally front view of the second craft is required.

Using a single camera, an alternative viewing path for selectively viewing the first or second model may be arranged by known optical means providing a double viewing path to both models and selectively illuminating one model or the other, or opening an optical shutter in one path or the other, to permit viewing of the required model.

Alternatively, two cameras may be used, one viewing each model, the cameras being made selectively operative according to the model required to be viewed.

Conveniently, both models are mounted on mutually rectangular pitch, roll and yaw axes, so that movement of the models about these axes involves no lateral displacements.

In order that the invention may be readily carried into practice, one embodiment will now be described in detail, by way of example, with reference to the accompanying drawings, the sole FIGURE of which is a diagram of apparatus for providing an image of a craft as viewed from any aspect angle, using two models with a single viewing camera.

In the drawing, a television camera 1 has a zoom objective lens 2 which defines an optical viewing path 3. The path 3 is split into two optical viewing paths 3' and 3'' by means of a semi-reflecting plate 4 and a mirror 5.

The path 3 is turned at right-angles at the front face of the semi-reflecting plate 4 to continue as path 3'. The path 3 also passes through the semi-reflecting plate 4 and is turned at right-angles at the front face of the mirror 5 to continue as path 3'', as shown.

The optical viewing path 3' is further reflected at mirrors 6 and 7 to view a model 10 from generally rear angles of view. The optical path 3'' is similarly further reflected at mirrors 8 and 9 to view a second model 11 from generally front angles of view.

The model 10 is illuminated by lamps indicated at 12 and 13. The model 11 is similarly illuminated by lamps 14 and 15.

The model 10 is mounted, from its front end, on a shaft 16 which defines a roll axis and which is driven (see arrow 16') by a roll servo motor, not shown, mounted on a carriage 17. The carriage 17 is driven by a pitch servo motor, not shown, around a part-circular track 18, in the direction of one of the arrows 18', the centre of which track 18 defines a pitch axis. The track 18 is mounted on a framework 19, which is rotated about a yaw axis 20 by means of a yaw servo motor 21. It will be noted that the model 10 is mounted at the point of intersection of the mutually perpendicular roll, pitch and yaw axes, as defined.

The model 10 is thus viewed along the viewing path 3' from all rear viewing aspect angles, according to its attitude as determined by the roll, pitch and yaw servo motors.

The model 11 is mounted, from its rear end, on a shaft 222 which defines the same roll axis as the shaft 16. The shaft 22 is driven (see arrow 22') by a roll servo motor, not shown, mounted on a carriage 23. The carriage 23 is driven by a pitch servo motor, not shown, around a part-circular tract 24, in the direction of one of the arrows 24' the centre of which tract 24 coincides with the pitch axis. The tract 24 is mounted on a framework 25, which is rotated about the yaw axis 26 by means of a yaw servo motor 27. The model 11 is similarly mounted at the point of intersection of the roll, pitch and yaw axes, as defined.

The model 11 is thus viewed along the viewing patch 3'' from all front viewing aspect angles, according to its attitude as determined by the roll, pitch and yaw servo motors for that model.

A first shutter 28, when open, makes the viewing path 3' operative. A second shutter 29, when open, makes the viewing path 3'' operative.

The flight simulator for the first craft will include, in the customary way, a dummy flight deck, housing the trainee crew and having a set of flight controls. An associated flight computer progressively computes the silumated flight of the first craft according to the displacements of the flight controls.

A flight path for the second craft is determined, or predetermined, in any convenient manner. By a supplementary computing operation, the procedures for which are known in the flight-simulator computing art and which do not concern the present invention, the associated computer computes the attitudes of both the first and second craft and the distance separating them and hence determines the aspect angle of the second craft as viewed from the first craft.

If the first craft lies in the hemisphere rearwards of the second craft, that is if the first craft is following the second, then the view of model 10 is required. Shutter 29 is closed and shutter 28 is opened.

If the first craft lies in the forward hemisphere, that is if the two craft are approaching each other, the view of model 11 is required. Shutter 28 is then closed and shutter 29 is opened.

Signals are supplied to the pitch, roll and yaw servos of either model 10 or model 11, according to which model is viewed.

It will be appreciated that the equivalent of a four-gimbal system of mounting is used for the models 10 and 11.

A three-gimbal physical mounting system is used for each model 10 and 11 and a fourth degree of freedom, equivalent to a fourth gimbal mounting, is provided by the erecting prism 30. Hence, it is necessary, in deriving these signals, to use the standard transformation for a four-gimbal system, such as has been described, for example, in the Royal Aircraft Establishment Technical Note No. I.E.E. 42 of April 1964, Part 3: Axis Transformation.

Whenever the computed viewing angle of the second craft approaches the circle centred at the intersection of the pitch and yaw axes, the servo motors of both models are supplied with complementary signals. In other words, when the viewpoint is about to change from forward viewing to rearward viewing, or vice versa, the attitude of both models is so arranged that no change of aspect is apparent when the view of one model is changed to the view of the other.

In fact, more than ±90° of pitch and more than ±90° of yaw, relative to the viewing axes 3' and 3'', are provided for both models. A relative roll angle of a full 360° is provided for both models.

A servo motor 39 is operated according to the computed distance separating the first and second craft and controls the setting of the zoom lens 2 to vary the size of the image of the second craft model 10 or 11.

Alternative means to the shutters 28 and 29 may be provided to select the view of model 10 or model 11. Thus, without using shutters, lamps 14 and 15 may be extinguished and lamps 12 and 13 lit to provide a view of model 10. Lamps 12 and 13 may be extinguished and lamps 14 and 15 lit to provide a view of model 11.

Alternatively, with both models illuminated, the semi-reflecting plate 4 may be replaced by a mirror. When such a mirror is in the position indicated at 4, the viewing path 3' of model 10 is operative. If the mirror 4 is laterally displaced to the position shown in broken lines at 4', the viewing path 3, 3'' of model 11 is operative.

As a further alternative, two television cameras may be used, one to view model 10 and the other to view model 11. The selection of the model viewed is then determined by selection of the television signal from the corresponding camera.

It is known, in ground-based flight simulator apparatus, to provide a visual display, corresponding to terrain overflown, by using a television camera to view a terrain model. A projected television image may then be provided on a projection screen located in front of the dummy flight deck, so that the display can be viewed by the trainee crew through the flight deck windows.

Using similar visual display apparatus, the television signal from camera 1 is fed by a line 32 to a television picture projector 33 to provide a visual image of the second craft upon the projection screen 34.

It will be appreciated that when the carriage 17 or 23 is moved through 90° around the pitch track 18 or 24, the second craft axis 16 or 22 coincides with the yaw axis 20 or 26. To simulate second craft yaw, which then corresponds to first craft roll, an erecting prism 30 is provided, between the plate 4 and the zoom lens 2, on the viewing axis 3. This erecting prism 30 is controlled in axial rotation by a servo motor 31 to rotate the viewing axes 3, 3' and 3''.

Alternatively, the camera 1 may be rotated on the axis of the lens 2.

As a further alternative, both tracks 18 and 24 may be similarly rotated about axes which coincide with the axis 16 and 22, as they are shown in the drawing for zero pitch of the models 10 and 11.

The apparatus described herein then provides an image of the second craft, viewed from any aspect angle about its pitch and yaw axes and for any angle of roll of both the first craft and the second craft.

The disposition of the image, on the forward axis of the first craft or at a limited angle of heading and of elevation, is provided by limited displacement of the axis of television projector 33, with respect to the centre of the projection screen 34, by motor means 35 and 36, which are arranged to displace the axis of the projector 33 laterally in directions horizontally and vertically of the screen 34 or to tilt the projector axis correspondingly, as is preferred.

Movement of the viewed second craft within the field of view of the trainee pilot, by movement of the projector 33, as described above, shows the invention in its simplest form. In a more sophisticated form, particularly when, as likely, it is desired to combine the image of the second craft with the image of a background scene, as by well-known electronic techniques, it is preferred to obtain the same visual effect by optical means, such as by providing reflecting prisms on the camera axis.

The mounting shafts 16, 22, the pitch tracks 18, 24 and carriage parts 17, 23 are all painted matt black, so that only the model itself is seen when viewed.

Visual effects, such as navigation lights, afterburner, or variable geometry, may be effected elecrically or mechanically by using hollow mounting shafts 16 and 22 which accomodate the required electrical leads or mechanical control rods to provide the effect required.

What we claim is:

1. For use in a ground-based flight simulator for simulating flight of a first craft, apparatus for producing an image of a second craft comprising first and second model means of said second craft, the first model means for providing a generally rear view and the second model means for providing a generally front view of said second craft, both model means being correspondingly movable according to the desired aspect angle of the second craft from the first craft, camera means and means for enabling the said camera means selectively to view alternately the first and the second of the two said model means.

2. Apparatus as claimed in claim 1, in which the camera means is a single television camera.

3. Apparatus as claimed in claim 2, in which the viewing axis of the said camera means is split by optical means to provide alternative viewing paths for viewing the two said model means.

4. Apparatus as claimed in claim 3, in which each of the alternative paths includes a shutter, the two shutters being adapted to open alternatively for alternative viewing of the first and the second model means.

5. Apparatus as claimed in claim 2, in which both model means are provided with illuminating lamp means for providing alternative viewing of the two model means by illuminating the one model means and alternatively the other said model means.

6. Apparatus as claimed in claim 2, including a television projector and projection screen, the television projector being electrically coupled to the television camera for deriving a signal from the said television camera and providing a projected image of the said second craft.

7. Apparatus as claimed in claim 2, in which the said camera has a zoom lens.

8. Apparatus as claimed in claim 1, in which the camera means comprises a pair of cameras, one camera for viewing each model means.

9. Apparatus as claimed in claim 1, in which both model means are mounted on three-gimbal systems having mutually perpendicular pitch, roll and yaw axes, and an erecting prism is provided on the viewing axis of the camera means.

10. Apparatus as claimed in claim 9, in which the model means for rearward views is mounted at its front by a rotatable axial shaft for providing roll and the model means for forward views is similarly mounted at its rear.

11. Apparatus as claimed in claim 10, in which both said model means have the axial shafts mounted on a carriage adapted for movement around a part-circular track, for movements of pitch, each said track being rotatable about a yaw axis.

12. In a ground-based flight simulation apparatus for simulataing flight of a first aircraft, a visual display apparatus for simulating all-round view of a second aircraft therefrom, comprising first and second model means of the said second aircraft, the first said model means having support means attached to the front thereof and depicting particularly the second aircraft rear, the second said model means having support means attached to the rear thereof and depicting particularly the second aircraft front, means attached to both model support means for simultaneously and correspondingly moving both model means, camera means for viewing either model means, and optical means enabling the camera means selectively to view alternately the rear of said first model means and the front of said second model means.

* * * * *